(12) United States Patent
Yamada et al.

(10) Patent No.: US 6,487,930 B1
(45) Date of Patent: Dec. 3, 2002

(54) CAM ACTUATED SPEED CHANGE MECHANISM

(75) Inventors: Silvio Yamada, Gahanna, OH (US); Tomaz Varela, Gahanna, OH (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 107 days.

(21) Appl. No.: 09/685,437

(22) Filed: Oct. 11, 2000

(51) Int. Cl.[7] .............................................. F16H 53/00
(52) U.S. Cl. .............................................. 74/567; 74/57
(58) Field of Search ................... 74/55, 56, 57, 74/63, 567, 569

(56) References Cited

U.S. PATENT DOCUMENTS

| | | | | |
|---|---|---|---|---|
| 1,195,665 A | * | 8/1916 | Etter | 74/57 |
| 1,339,276 A | * | 5/1920 | Murphy | 74/56 |
| 5,312,306 A | * | 5/1994 | Folino | 475/196 |
| 5,865,071 A | * | 2/1999 | Mimura | 74/650 |
| 6,270,442 B1 | * | 8/2001 | Folino et al. | 476/18 |
| 6,308,586 B1 | * | 10/2001 | Berger | 74/63 |

* cited by examiner

*Primary Examiner*—David A. Bucci
*Assistant Examiner*—Justin Stefanon
(74) *Attorney, Agent, or Firm*—Carlson, Gaskey & Olds

(57) ABSTRACT

A speed reducer utilizes a cam driver and a cam follower both having sinusoidal grooves. The numbers of peaks and valleys in the cam driver and the cam follower grooves are controlled to achieve a desired change in speed between an input shaft and an output shaft. The use of the cam drive system allows a wide range of speed control in a relatively small package, and further ensures quiet operation.

15 Claims, 1 Drawing Sheet

CAM ACTUATED SPEED CHANGE MECHANISM

BACKGROUND OF THE INVENTION

This application relates to a speed change mechanism wherein a cam groove transfers rotation between an input and output shaft, and achieves the speed reduction.

Speed reducers are utilized to achieve a distinct rotational speed at an output shaft relative to an input shaft. In many applications, an input speed of a particularly high value is reduced to a lower speed for an output application. This may happen, as an example, in an automotive application wherein the input speed is somewhat dependent on the engine speed, or on the speed of a particular motor. On the other hand, in some instances it is desirable to increase the speed between the input and the output shaft.

In the past, various gearing mechanisms have been utilized wherein the number of teeth on input and output gear sets are selected to achieve a predetermined speed change. Speed reducers have often utilized planetary gearbox arrangements. This is sometimes somewhat limited in that the output rotational direction cannot be changed, and the potential size of the speed reducer limits the amount of speed reduction available. Further, high noise and vibration due to gear tooth meshing often occurs.

SUMMARY OF THE INVENTION

In a disclosed embodiment of this invention, a change speed mechanism includes a cam driver associated with an input shaft and a cam follower associated with an output shaft. A moving member connects the cam driver to the cam follower. The cam driver and cam follower each have a cam groove with a generally sinusoidal shape. The number of peaks and valleys in the follower and driver are different. If the device is to be a speed reducer, then the cam follower will have more peaks and valleys than the cam driver. On the other hand, if the mechanism is utilized to increase speed, the reverse would be true.

A pin is mounted in the moving member and engaged in the groove in the cam driver. As the cam driver turns, it causes the pin and the moving member to move axially. A pin at another end of the moving member is received in the groove in the cam follower. As this second pin moves, it moves through the groove in the cam follower, and causes the cam follower to rotate. In this way, rotation is transmitted from the cam driver to the cam follower. By controlling the number of peaks and valleys in the respective grooves in the cam driver and cam follower, a desired speed change is achieved. For purposes of this application, the application will be described as a speed reducer. However, a worker in this art would recognize that by simply reversing the arrangement of parts, a speed increase device could also be achieved.

The pins in the cam follower and cam driver grooves are positioned at approximately equal positions. Further, a second moving member having pins engaged in a second cam groove in both the driver and cam follower is also operating in a similar fashion to the initial moving member and its pins. The second moving member typically has its pins somewhat offset from the pins of the first moving member. In this way, the cam follower tends to be driven even at the extreme ends of the first moving member, at which there might otherwise be a short break in rotation. That is, the second moving member acts to continue to drive the cam follower at the extreme ends of the sinusoidal peaks in the first grooves.

These and other features of the present invention can be best understood from the following specification and drawings, the following which is a brief description.

DETAILED DESCRIPTION OF A PREFERRED EMBODIMENT

Figure 1:
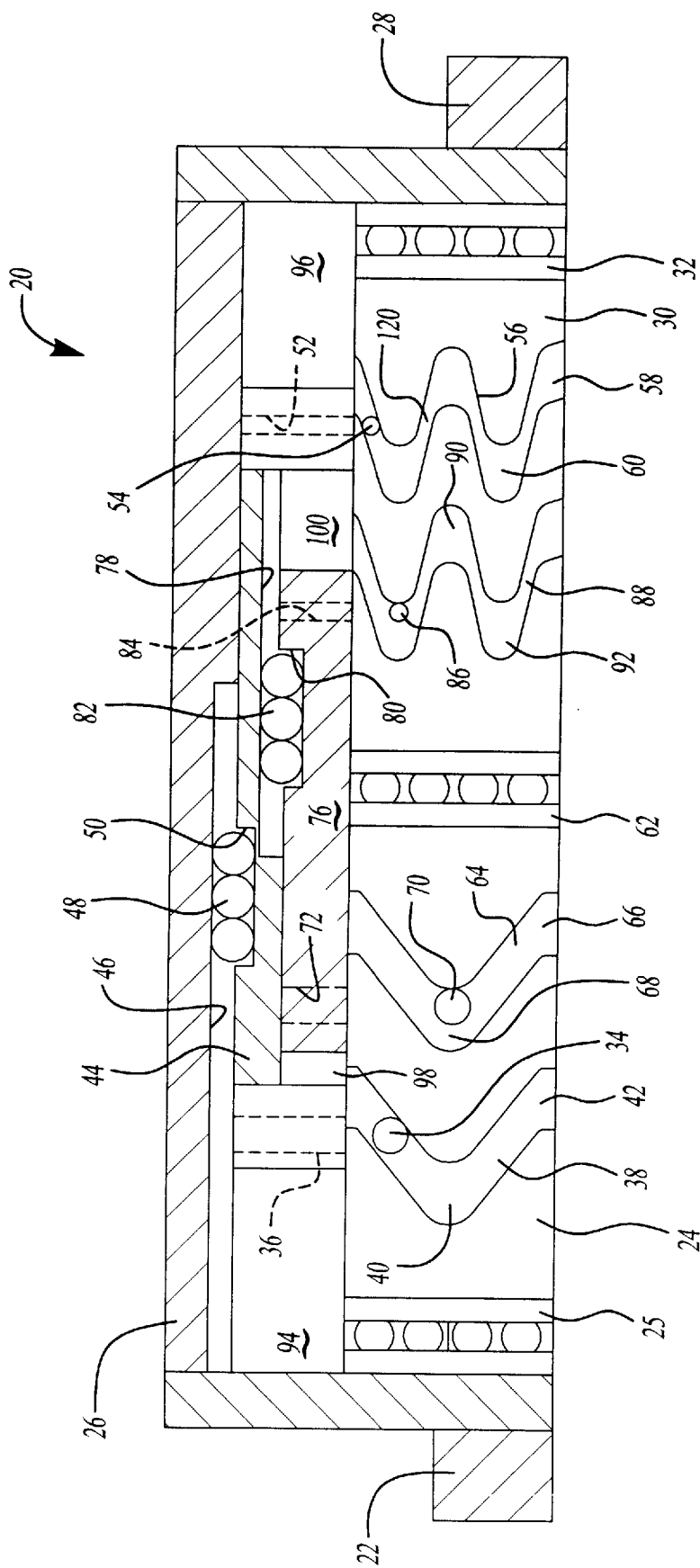
FIG. 1 shows a speed change mechanism.

A change speed mechanism 20 is illustrated in FIG. 1. An input shaft 22 drives a cam driver 24. A thrust bearing 25 is positioned between a housing 26 and the cam driver 24. An output shaft 28 rotates with a cam follower 30. A thrust bearing 32 is positioned between the housing 26 and the cam follower 30. A pin 34 is mounted in a groove 36 in a first moving element 44. The pin 36 moves within a groove 38 having a sinusoidal shape with spaced peaks 42 and valleys 40. Thus, as the cam driver 24 turns, the pin 34 is caused to move to the left or right as shown in the FIG. 1 within the groove 38. It should be understood that the figure is a partial cross-section, and that each of the elements 24, 30, 22, 28 and 44 are cylindrical. There may be a plurality of circumferentially spaced pins 34 in the groove 38.

As the pin 36 is caused to move to the left and right, the first moving element 44 also moves in that direction. A plurality of axial grooves 46 are formed in an inner periphery of the housing 26. Balls 48 are received between the groove 46 and a groove 50 in the outer periphery of the first moving member 44. These balls constrain member 44 to axial movement to the left or right as shown in this figure.

Spaces 52 at the opposed end of the first moving member 44 receive pins 54 which are received in a groove 56 in the cam follower 30. As shown, the groove 56 also has peaks and valleys 58 and 60. A central thrust bearing 62 is positioned between the cam driver 24 and the cam follower 30.

By controlling the number of peaks and valleys 56 and 60 in the cam follower relative to the numbers of peaks and valleys 40 and 42 in the driver, the present invention achieves a speed reduction. Again, a worker in this art would recognize that by simply reversing this relationship one could achieve a speed increase.

The speed reduction is achieved since as the cam driver 24 rotates, it causes the pins 34 to reciprocate. This causes the first moving member 44 to reciprocate. As the first moving member 44 reciprocates, the pins 54 also reciprocate within their groove 56. However, since there are greater number of peaks and valleys 58 and 60 in the cam follower groove 56, than there are in the cam driver groove 38, the rotational speed of the cam follower 30, and thus the output shaft 28, will be lower than the input speed of the input shaft 22. Thus, a speed reduction is achieved. The present invention achieves the speed reduction without any gear engagement, and is thus smaller and quieter than the prior art. Moreover, by simply changing the number of peaks and valleys in the two cam elements, one can achieve a wide range of speed reductions within approximately the same envelope size.

The present invention further includes a second moving member 76. The second moving member 76 includes a pin 70 received within aperture 72, and movable within a second groove 66 in the cam driver 24. Preferably, second groove 66 has approximately equally located peaks and valleys 64 and 68 as the main groove 38. Thus, as the cam driver 24 is rotating, not only is the first moving member 44 reciprocating, the second moving member 76 is also reciprocating. As is clear, the pins 70 are preferably offset from the pins 34 such that when the pin 70 is at a peak or valley 64, 68, the pin 34 is not. In this way, one of the pins is always in a ramp portion rather than at an end portion. Any hesitation to continue to drive the speed reducer at the end of either a peak or valley is thus reduced.

The second moving member 76 is guided within axial groove 78 in the inner periphery of the first moving member 44. A groove 80 in the outer periphery of the second moving member 76 receives balls 82 for guiding the movement. Openings 84 receive pins 86 in a groove 88 in the cam follower 30. The groove 88 has peaks and valleys 90 and 92. Again, the grooves 88 should be similar in shape to the groove 56. Also, as is clear, while the pin 86 is shown at an extreme, the pin 54 is still within a ramp portion. This is true for the same reason as with the cam driver. Any hesitation to continue to drive the output shaft 28 at an extreme end is thus reduced.

Chambers 94 and 96 are positioned at ends of the first moving member 44. Similar chambers 98 and 100 are positioned at ends of the second moving member 76. These chambers allow for movement of the moving members 44 and 76.

Now, as the shaft 22 is driven, it causes the cam driver 24 to rotate. The cam driver 24 causes the first moving member 44 and the second moving member 76 to reciprocate. The pins from the first and second moving members 44 and 76 move within the grooves in the cam follower 30. This causes the cam follower to rotate, and hence causes shaft 28 to rotate. However, since there are a distinct number of peaks and valleys in the grooves in the cam driver 24 than the cam follower 30, the cam follower will rotate at a slower speed than the cam driver. Thus, a speed reduction will be achieved with a relatively quiet, small, reliable and simple device.

By reversing the position of the pins from that shown in FIG. 1 within the cam driver 24 and cam follower 30, the direction of the rotation through the speed change system can also be reversed. As an example, if the pin 54 were moved to the point 120 shown in FIG. 1, then the direction of rotation of the cam driver 24 will be opposed to that of the cam follower 30. Thus, a clockwise input can be turned into a counter-clockwise output.

Although a preferred embodiment of this invention has been disclosed, a worker in this art would recognize that many modifications would come within the scope of this invention. For that reason, the following claims should be studied to determine the true scope and content of this invention.

What is claimed is:

1. A speed change mechanism comprising:
    an input shaft driving a cam driver, said cam driver having a generally sinusoidal shaped groove in an outer peripheral surface, said generally sinusoidal shaped groove extending around an entire circumference of said cam driver, and having a first number of peaks and valleys;
    a moving member having a first pin received within said groove in said cam driver, and said moving member being guided for axial movement as said pin moves within said groove in said cam driver, said moving member carrying a second pin;
    a cam follower having a groove at an outer peripheral surface, said groove in said cam follower being generally sinusoidal and having a second number of peaks and valleys, and said second pin being received within said groove in said cam follower, and said cam follower driving an output shaft; and
    said first number of peaks and valleys is different than said second number of peaks and valleys such that a change in speed is achieved between said input and output shaft, said cam driver and said cam follower rotatable about a common axis such that said cam driver causing said cam follower to rotate with said change in speed through the interaction of said moving member.

2. A mechanism as recited in claim 1, wherein said second number is greater than said first number such that said mechanism operates as a speed reducer.

3. A mechanism as recited in claim 1, wherein an outer housing surrounds said cam driver and said cam follower, and said outer housing having an axial groove at an inner peripheral surface receiving members which restrain rotation of said first moving member.

4. A speed change mechanism comprising:
    an input shaft driving a cam driver, said cam driver having a generally sinusoidal shaped groove in an outer peripheral surface, said generally sinusoidal shaped groove extending around an entire circumference of said cam driver, and having a first number of peaks and valleys;
    a moving member having a first pin received within said groove in said cam driver, and said moving member being guided for axial movement as said pin moves within said groove in said cam driver, said moving member carrying a second pin;
    a cam follower having a groove at an outer peripheral surface, said groove in said cam follower being generally sinusoidal and having a second number of peaks and valleys, and said second pin being received within said groove in said cam follower, and said cam follower driving an output shaft;
    said first number of peaks and valleys is different than said second number of peaks and valleys such that a change in speed is achieved between said input and output shaft;
    an outer housing surrounding said cam driver and said cam follower, and said outer housing having an axial groove at an inner peripheral surface receiving members which restrain rotation of said first moving member; and
    a plurality of balls are received in said axial groove, and are also received in an axial groove in an outer peripheral surface of said first moving member.

5. A mechanism as recited in claim 4, wherein said cam driver and said cam follower are both rotatable about a common axis with said cam driver causing said cam follower to rotate about said common axis with said change in speed.

6. A speed change mechanism comprising:
    an input shaft driving a cam driver, said cam driver having a generally sinusoidal shaped groove in an outer peripheral surface, said generally sinusoidal shaped groove extending around an entire circumference of said cam driver, and having a first number of peaks and valleys;
    a moving member having a first pin received within said groove in said cam driver, and said moving member being guided for axial movement as said pin moves within said groove in said cam driver, said moving member carrying a second pin;
    a cam follower having a groove at an outer peripheral surface, said groove in said cam follower being generally sinusoidal and having a second number of peaks and valleys, and said second pin being received within said groove in said cam follower, and said cam follower driving an output shaft;

said first number of peaks and valleys is different than said second number of peaks and valleys such that a change in speed is achieved between said input and output shaft; and a second moving member has a third pin received in a second groove in said cam driver, and also has a fourth pin received in a second groove in said cam follower, said pins in said second grooves of said cam driver and said cam follower being mounted out of phase relative to said first and second pins such that said second moving member ensures a more constant transmission of rotation at the positions where said first and second pins are received at a peak or valley in said first cam grooves.

7. A mechanism as recited in claim 6, wherein said cam driver and said cam follower are both rotatable about a common axis with said cam driver causing said cam follower to rotate about said common axis with said change in speed.

8. A mechanism as recited in claim 1, wherein a thrust bearing is positioned between said housing and said cam driver, and a second thrust bearing is positioned between said housing and said cam follower.

9. A mechanism as recited in claim 8, wherein a third thrust bearing is positioned between said cam driver and said cam follower.

10. A speed change mechanism comprising:

an input shaft driving a cam driver, said cam driver having a generally sinusoidal shaped groove in an outer peripheral surface, said generally sinusoidal shaped groove extending around an entire circumference of said cam driver, and having a first number of peaks and valleys;

a moving member having a first pin received within said groove in said cam driver, and said moving member being guided for axial movement as said pin moves within said groove in said cam driver, said moving member carrying a second pin;

a cam follower having a groove at an outer peripheral surface, said groove in said cam follower being generally sinusoidal and having a second number of peaks and valleys, and said second pin being received within said groove in said cam follower, and said cam follower driving an output shaft;

a second moving member having a third pin received in a second groove in said cam driver and a fourth pin received in a second groove in said cam follower, said pins in said second grooves of said cam driver and said cam follower being mounted out of phase relative to said first and second pins, such as said second moving member ensures a more constant transmission of rotation at the positions where said first and second pins are received at a peak or valley in said first cam grooves, and said second groove in said cam driver having said first number of peaks and valleys and said second groove in said cam follower having said second number of peaks and valleys;

an outer housing surrounding said cam driver and said cam follower, said outer housing having an axial groove at an inner peripheral surface receiving members which restrain rotation of said first moving member, and said second moving member being mounted radially within said first moving member and being constrained from rotating relative to said first moving member; and said first and second numbers are different.

11. A mechanism as recited in claim 10, wherein said second number is greater than said first number such that said mechanism operates as a speed reducer.

12. A mechanism as recited in claim 10, wherein a plurality of balls are received in said axial groove, and are also received in an axial groove in an outer peripheral surface of said first moving member.

13. A mechanism as recited in claim 10, wherein a thrust bearing is positioned between said housing and said cam driver, and a second thrust bearing is positioned between said housing and said cam follower.

14. A mechanism as recited in claim 13, wherein a third thrust bearing is positioned between said cam driver and said cam follower.

15. A mechanism as recited in claim 10, wherein said cam driver and said cam follower are both rotatable about a common axis with said cam driver causing said cam follower to rotate about said common axis with said change in speed.

* * * * *